United States Patent
Bub et al.

(10) Patent No.: US 6,693,411 B2
(45) Date of Patent: Feb. 17, 2004

(54) SWITCH MODE POWER STAGE

(75) Inventors: Stephen Leonard Bub, Bronte (AU); Alexandre Pogossov, Oatlands (AU)

(73) Assignees: Cleansun Pty. Ltd., Victoria (CA); WBC No. 4 Pty. Ltd., Queensland (AU); Pacific Solar Sub 1 Pty. Ltd., New South Wales (AU)

( * ) Notice: Subject to any disclaimer, the term of this patent is extended or adjusted under 35 U.S.C. 154(b) by 64 days.

(21) Appl. No.: 10/155,689

(22) Filed: May 24, 2002

(65) Prior Publication Data

US 2002/0180411 A1 Dec. 5, 2002

(51) Int. Cl.⁷ .............................................. G05F 1/63
(52) U.S. Cl. ...................................... 323/282; 323/222
(58) Field of Search .............................. 323/222, 282, 323/284, 351

(56) References Cited

U.S. PATENT DOCUMENTS

| | | | | |
|---|---|---|---|---|
| 4,841,220 A | * | 6/1989 | Tabisz et al. .............. 323/282 |
| 4,866,367 A | * | 9/1989 | Ridley et al. ............... 323/287 |
| 4,931,716 A | * | 6/1990 | Jovanovic et al. .......... 323/285 |
| 5,180,964 A | * | 1/1993 | Ewing ....................... 323/222 |
| 5,367,247 A | * | 11/1994 | Blocher et al. ............. 323/222 |
| 5,396,165 A | * | 3/1995 | Hwang et al. .............. 323/210 |
| 5,615,101 A | * | 3/1997 | Moriarty .................... 363/101 |
| 5,856,919 A | * | 1/1999 | Moriarty, Jr. ............... 363/101 |
| 6,351,108 B1 | * | 2/2002 | Burstein et al. ............ 323/283 |
| 6,400,126 B1 | * | 6/2002 | Zuniga et al. .............. 323/282 |
| 6,441,598 B1 | * | 8/2002 | Ivanov ...................... 323/284 |

* cited by examiner

*Primary Examiner*—Adolf D. Berhane
(74) *Attorney, Agent, or Firm*—Kilpatrick Stockholm LLP

(57) ABSTRACT

The invention provides a power conversion device operable in a discontinuous conduction mode under the control of a switch. During operation in the discontinuous conduction mode, an oscillating voltage exists across the switch means prior to a turn-on of the switch means. The power conversion the device comprises a switching controller arranged to ensure that turn-on of the switch occurs at a minimum of the oscillating voltage. The power conversion device also comprises a timer arranged to provide a controlled time period following a first turn-on of the switching means, during which a second turn-on of the switching means can not occur. Such an arrangement is advantageous in that a low power level of operation of the device and a short conduction time of the switch means does not lead to an undesirable increase in switching frequency. Consequently, a reduction in a parasitic capacitance of the switch will be rewarded by an increase in efficiency.

48 Claims, 4 Drawing Sheets

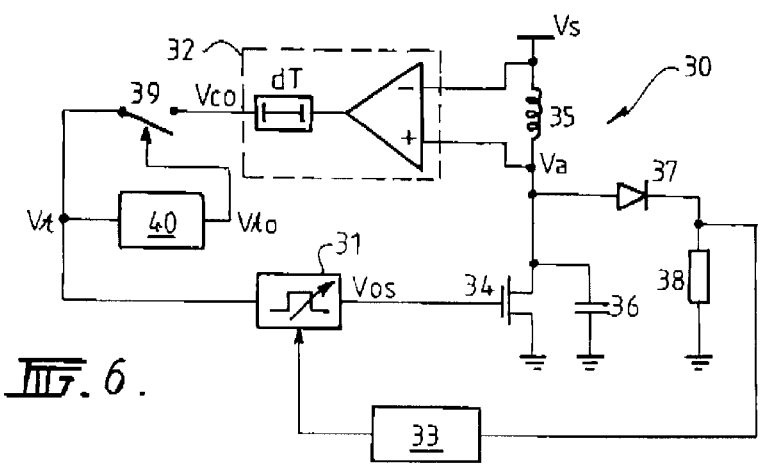
FIG. 6.
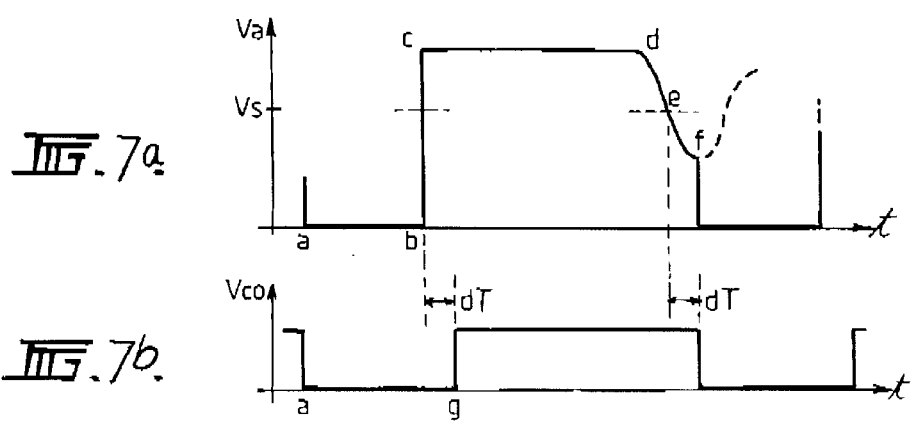
FIG. 7a.
FIG. 7b.
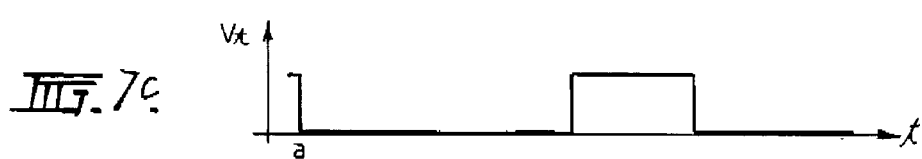
FIG. 7c.
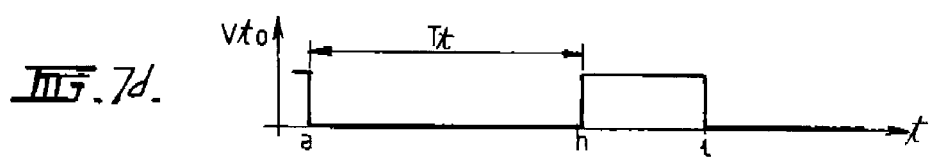
FIG. 7d.
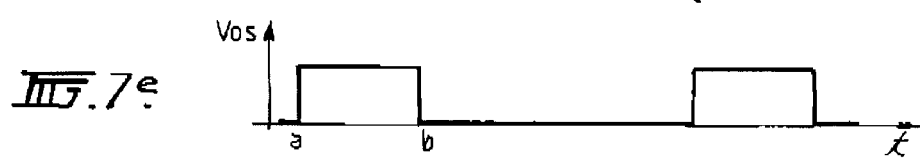
FIG. 7e.

SWITCH MODE POWER STAGE

TECHNICAL FIELD

The present invention relates generally to the field of power conversion devices and in particular, the invention provides an improved efficiency power stage.

BACKGROUND TO THE INVENTION

FIG. 1 illustrates a conventional boost/fly-back power stage 10, which consists of a saw-tooth generator 11, a pulse-width modulator 12, feedback loop 13, a switch 14, an inductor 15, a parasitic capacitance 16, a rectifier 17 and a load 18.

FIG. 2 illustrates operation of the power stage of FIG. 1 in the discontinuous conduction mode. During time interval "A-B" switch 14 is ON and $V_a$ is substantially zero, causing current to ramp up in the inductor 15. When the signal from the saw-tooth generator 11 exceeds a signal from the feedback loop 13, the switch 14 is turned OFF ("B-C"). The current through the inductor then flows into the load 18 during time interval "C-D", thus performing an energy transfer from the inductor 15 to the load 18. The current in the inductor ramps down throughout the "C-D" interval depending on the value of load 18. When the current in the inductor 15 reaches zero, a free oscillation begins ("D-E"). The frequency of this oscillation depends on the parasitic parameters of the switch (parasitic capacitance 16) and the value of the inductor 15. At time "E" determined by the generator 11 a new switching cycle begins ("E-A").

When the circuit operates at a different power level, a relative position of the oscillating waveform "D-E" with respect to the beginning of a new cycle changes (A-B'-C'-D'-E'-A'). Therefore, with a different power level, switching can occur anywhere on the curve—at a maximum, ("E"), minimum ("E") or anywhere in between.

Consequently this power stage has the problem that, when it is used in wide dynamic range applications, such as power factor correction (PFC) converters, it yields high harmonic distortion. The reasons for the high harmonic distortion are;

1. Variation of point "E" with respect to the voltage supply $V_s$ causes variation of power loss at the moment when the switch 14 is turned on. This is because the switching loss is high when the transition "E-A" is large, and the switching loss is low when the transition is small ("E-A"). As a result the power stage has high harmonic distortion in PFC applications.

2. Variation of point "E" with respect to $V_3$ causes variation of the control loop gain which degrades load regulation and also increases the harmonic distortion.

FIG. 3 illustrates another power stage topology 20, called quasi-resonant turn-ON, which has more stable loop gain, lower harmonics and higher efficiency. (See *MC34262 Power Factor Controllers semiconductor technical data, Motorola, 1996*).

The power stage 20 consists of a one-shot pulse generator 21, a pulse duration of which is controlled by the feedback 23. The one-shot 21 is triggered by the comparator 22 with internal delay dT. Comparator 22 compares the voltage across the inductor 25, Switch 24, parasitic capacitance 26, rectifier 27 and load 28 are of the standard topology.

FIG. 4 illustrates operation of the power stage 20. During the time interval "F-G", the one-shot 21 generates a pulse which closes the switch 24, causing current in the inductor 25 to ramp up. The duration of the time interval "F-G" depends on the output of the feedback 23 which in turn depends on the error between the real load voltage $V_L$ and a target value. When the pulse generated by the one-shot 21 finishes, the switch 24 turns OFF, and the current in the inductor 25 passes into the load 27 during interval "H-I" and ramps down once again in a manner which depends on the value of load 28. When the current in the inductor 25 becomes zero ("I"), self oscillation begins in the tank formed by the inductor 25 and the parasitic capacitance 26. At point "J" the comparator 22 detects voltage polarity reversal across the inductor 25. After the internal propagation delay of dT, ie at point "K", the one-shot 21 is restarted, and the above described process repeats. By adjusting the delay dT to about one-quarter of the self-oscillation period of the inductor 25 and parasitic capacitance 26 it is possible to achieve switching at the bottom of the oscillating waveform thus maximising efficiency.

Due to the fact that point "K" is always below supply voltage $V_s$, circuit 20 has an advantage over circuit 10 of FIG. 1 in that the loop gain is not subject to fluctuations, resulting in lower harmonics.

However power stage 26 does have a disadvantage in that it has low efficiency at low power level.

This is because at low power level, the duration of both the primary conduction time ("L-M") and the secondary conduction time ("N-O") is small, as shown in FIG. 5. This results in shrinking of the switching period down to perhaps half of the self-oscillation period. As a result the switching frequency undesirably increases, resulting in high switching loss. Attempts to reduce the parasitic capacitance 26 would not help increase efficiency because the switching frequency would increase even more. Therefore, there exists a need for a power stage which minimises switching losses and possesses high efficiency both at high power levels and at low power levels.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect, the present invention provides a power conversion device operable in a discontinuous conduction mode under the control of a switching means and wherein during operation in the discontinuous conduction mode, an oscillating voltage exists across the switching means prior to a turn-on of the switching means, the device comprising:

switch control means arranged to cause turn-on of the switching means to occur at a minimum of the oscillating voltage; and timing means arranged to provide a controlled time period following a first turn-on of the switching means, during which a second turn-on of the switching means can not occur.

The power conversion device of the first aspect of the present invention is advantageous in that a low power level of operation of the device and a short conduction time of the switching means does not lead to an undesirable increase in switching frequency. Consequently, a reduction in a parasitic capacitance of the switch will be rewarded by an increase in efficiency.

Furthermore the present invention is of particular importance in high efficiency applications, where an increase in efficiency of even a fraction of a percent is of importance.

Preferably, the timing means comprises a gate which, when open, prevents a turn-on signal from reaching the switching means, or, alternatively prevents generation of a turn-on signal; and a timer which is reset at each turn-on of the switching means, and holds the gate open for the controlled time period following each reset.

The switch control means preferably comprises:

a comparator arranged to compare the oscillating voltage to a reference voltage about which the oscillating voltage oscillates, and to produce an output logic signal corresponding to the polarity of the oscillating voltage with respect to the reference voltage;

delay means arranged to delay the output logic signal by one quarter of a period of oscillation of the oscillating voltage to produce a delayed logic signal; and a turn-on signal generator arranged to generate a turn-on signal for the switching means when the delayed logic signal indicates a negative polarity of the oscillating voltage with respect to the reference voltage.

The delay means may delay the output logic signal by a predetermined fixed time period corresponding to one quarter of a standard oscillation period. In such embodiments, variations in the actual oscillation period, for example, due to variations in parasitic elements of the circuit, may cause the predetermined fixed time period to not correspond exactly to one quarter of the actual oscillation period. Therefore, turn-on of the switching means may not occur precisely at a minimum of the oscillating voltage. However, switch turn-on occurring in the vicinity of the minimum is still sufficient to provide a reduction in switching losses, and embodiments of this type require very little circuitry and therefore consume small amounts of power.

Alternatively, embodiments of the delay means may comprise a slope detector or the like to monitor the oscillating voltage and to indicate when the oscillating voltage is at a minimum. Such embodiments allow switch turn-on to occur more accurately at the minimum of the oscillating voltage, although possibly at the cost of higher total power consumption due to the power requirements of the slope detector.

The delay means may be internal to the comparator, or may be a separate circuit, situated at the input or output of the comparator. Further, the delay means may be implemented by an analog circuit (for example, an RC delay circuit), a digital circuit (for example, a chain of D flip-flops having C inputs connected to a clock signal) or by software (for example, a loop in a microprocessor routine with timer interrupts).

According to a second aspect, the present invention provides a method of operating a power conversion device in a discontinuous conduction mode comprising the steps of:

controlling operation of the device in the discontinuous conduction mode with a switching means;

causing turn-on of the switching means to occur when an oscillating voltage across the switching means is at a minimum; and providing a controlled time period following a first turn-on of the switching means, during which a second turn-on of the switching means can not occur.

According to a third aspect, the present invention provides a power conversion device comprising:

an inductor and a switch connected in series across a power supply;

a rectifier and load connected in series across the switch;

a one-shot arranged to provide a pulse of controlled duration to the input of the switch;

a comparator and delay means arranged to detect a voltage polarity reversal across the inductor and to produce a delayed logic signal corresponding to the voltage polarity across the inductor; and means for providing a controlled time period following a first pulse of the one-shot during which the comparator can not trigger the one-shot.

In preferred embodiments of the third aspect of the invention, the controlled time period is provided by a gate connected between an output of the comparator and an input of the one-shot, where the gate is held open for the controlled time period, thereby preventing any trigger signal produced by the comparator from triggering the one-shot during the controlled time period. In such embodiments the gate is preferably controlled by a timer having a reset input connected to the input of the one-shot, such that each time the one-shot is triggered, the timer is reset and holds the gate open for the controlled time period.

Embodiments of the third aspect of the invention may further comprise a feedback or feedforward control means. The feedback or feedforward control means may use load voltage, load current, supply voltage, voltage across the switch means, or a combination of the above to control a pulse duration of the one-shot. Examples of circuit parameters which may be used to control/regulate a pulse duration of the one-shot include, a) current of the load (for regulation purposes) and voltage across the inductive element (for monitoring oscillations);

b) voltage of the load (for regulation purposes) and voltage across the inductive element (for monitoring oscillations);

c) current of the load (for regulation purposes) and voltage across the switching means (for monitoring oscillations);

d) voltage of the load (for regulation purposes) and voltage across the switching means (for monitoring oscillations);

e) voltage of the load and voltage of the supply $V_s$ (both for control purposes and for calculation of the expected oscillation minima);

f) voltage of the load and voltage of the supply $V_s$ (for control purposes) and voltage across the switching element (for detecting oscillation minima).

g) voltage across the switching means (for indirect control and for detecting oscillation minima).

In preferred embodiments of the third aspect of the invention, the delay means delays the logic signal by a fixed period corresponding to one quarter of a standard oscillation period of an oscillating voltage across the switch. Alternatively, embodiments of the delay means may comprise a slope detector to monitor the oscillating voltage and to indicate when the slope is zero. Such embodiments allow switch turn-on to occur more accurately at the minimum of the oscillating voltage, although possibly at the cost of higher total power consumption due to the power requirements of the slope detector.

The delay means may be internal to the comparator, or may be situated at an input or output of the comparator.

Further, the delay means may be implemented by an analog circuit (for example, an RC delay circuit), a digital circuit (for example, a chain of D flip-flops having C inputs connected to a clock signal) or by software (for example, a loop in a microprocessor routine with timer interrupts).

According to a fourth aspect the present invention provides, in a power conversion circuit operating in a discontinuous conduction mode under the control of a switching means, a voltage waveform across the switching means comprising:

a first voltage waveform portion during which the switching means is on, allowing a current to build in an inductive element;

a second voltage waveform portion after the first voltage waveform portion, during which the switching means is off, voltage across the switching means is non-zero and the current in the inductive element falls; and a third voltage waveform portion after the second voltage waveform portion during which the switching means remains off and the voltage waveform is oscillatory;

wherein a subsequent turn-on of the switching means occurs proximal to a minimum of the oscillatory voltage waveform, and wherein the subsequent turn-on of the switching means occurs only after a controlled time period has passed since the start of the first voltage waveform portion

BRIEF DESCRIPTION OF THE DRAWINGS

Embodiments of the invention will now be described by way of example, with reference to the accompanying drawings in which:

FIG. 6 illustrates a preferred embodiment of the present invention; and

FIGS. 7a–7e and 8a–8e illustrate operation of the circuit of FIG. 6

DETAILED DESCRIPTION OF EMBODIMENTS OF THE INVENTION

Figure 1:
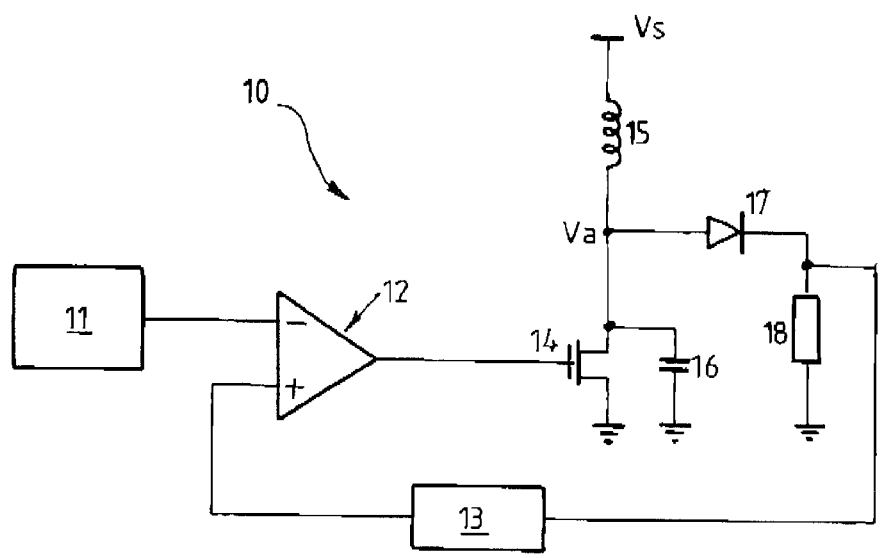
FIG. 1 illustrates a conventional prior art boost/fly-back power stage.
Figure 2:
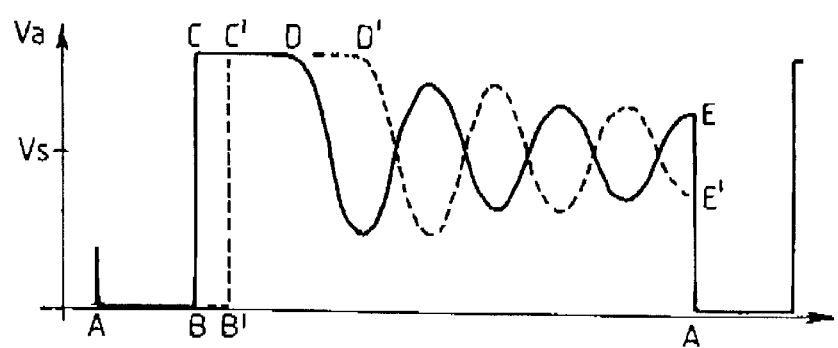
FIG. 2 illustrates operation of the circuit of FIG. 1.

FIG. 6 illustrates a power stage 30 in accordance with the invention which consists of a one-shot pulse generator 31, an output of which is connected to an input of the switch 34, with parasitic capacitance 36. Rectifier 37 and load 38 are connected across the switch 34, and inductor 35 is in series with the switch 34. Feedback 33 controls a pulse width of the one-shot 31 based on a voltage of the load 38, and the comparator 32 with delay dT has inputs connected in parallel to the inductor 35. Power stage 30 further includes a gate 39 and a timer 40 with reset, with the output of the gate 39 connected to the "reset" input of the timer 40 and to the input of the one-shot 31. The signal input of the gate 39 is connected to the output of the comparator 32, while the control input of the gate is connected to the output of the timer 40

Operation of the power stage 30 at high power is illustrated by FIG. 7, where $V_a$ is a voltage across the switch, and logic signals are marked as follows:

$V_{co}$—output of comparator 32;
$V_t$—input to the "reset" of the timer 40 and "start" of the one-shot 31;
$V_{to}$—timer 40 output;
$V_{os}$—one shot 31 output.

In the present embodiment, both the timer "reset" and one-shot "start" are active at negative transition, comparator 32 has a delay time of dT, and timer 40 stays at low output for a time $T_t$ after each reset.

At point "a" in FIGS. 7a–7e the one-shot 31 has been triggered by a negative transition of $V_t$. Triggering the one-shot causes it to generate a pulse of width "a-b" (FIG. 7e), the width being controlled by feedback control means 33. The pulse causes switch 34 to turn on, and during period "a-b", current in inductor 35 ramps up. The negative transition of $V_t$ also resets timer 40 which then maintains a low output $V_{to}$ for a controlled time period $T_t$ (FIG. 7d), thus holding gate 39 open for the period $T_t$. When the one-shot pulse finishes at "b" (FIG. 7e), the switch 34 opens and voltage Va flies back high "b-c" (FIG. 7a), and so the current in the inductor 35 steers into the load 38. As a result of a voltage polarity reversal during "b-c", the output $V_{co}$ of comparator 32 switches with some delay dT at point "g" (FIG. 7b). Switching of the output $V_{co}$ of the comparator 32 does not trigger any event since the timer output $V_{to}$ is still low (FIG. 7d), and so the gate 39 is still open. After period $T_t$ expires the timer 40 returns $V_{to}$ to a high output level at point "h" (FIG. 7d). This event causes the gate 39 to close and $V_t$ is forced high by the comparator 32 (FIG. 7c). However, positive transition of $V_t$ also does not trigger any event since both the one-shot 31 and the timer 40 are negative transition sensitive.

At point "d" all the energy in the inductor 35 is exhausted, and free oscillation begins "d-e-f" (FIG. 7a). Although voltage across the inductor 35 reverses at point "e" the output $V_{co}$ of the comparator 32 toggles at point "f" due to the delay dT (FIG. 7b). Negative transition of $V_{co}$ from the comparator 32 passes through the closed gate 39 and retriggers the one-shot 31 (FIG. 7e), as well as resetting the timer 40 at point "i" (FIG. 7d). Another cycle begins as described above.

It can be seen that at high power, operation of the power stage 30 of the present invention possesses the high efficiency associated with quasi-resonant turn-on of switch 34 at point "f". It can be seen that at high power, where duration "a-b" of the pulse from the one-shot 31 is relatively long, the timer 40 does not affect the switching process since time $T_t$ is smaller than the power conversion duration "a-b-c-d-e-f". Therefore, at high power, the power stage 30 operates in a critical conduction mode with low control distortion and high efficiency.

Figure 8A:
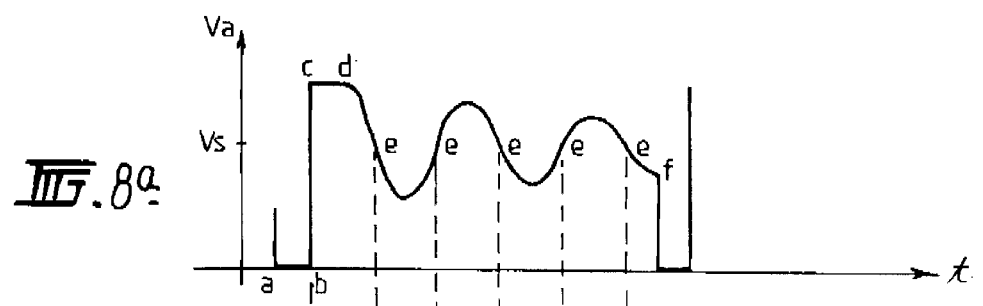
Figure 8B:
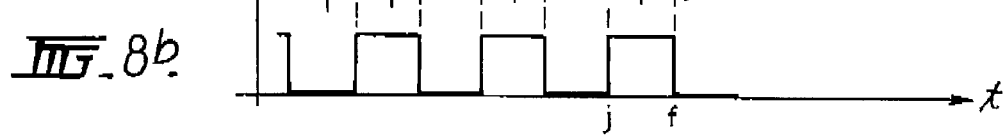
Figure 8C:
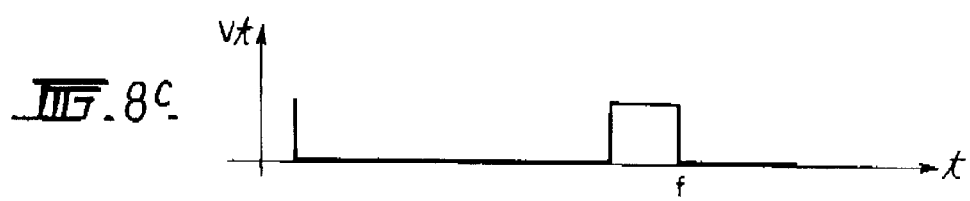
Figure 8D:
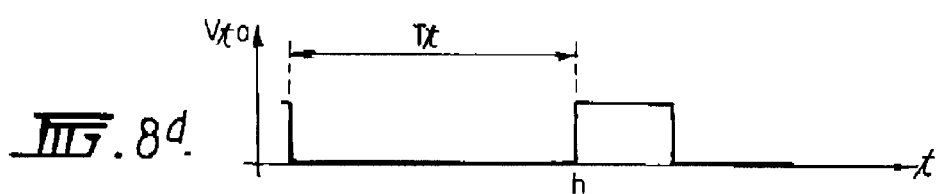
Figure 8E:

FIGS. 8a to 8e illustrate operation of circuit 30 at low power. Once again, one-shot 31 is triggered at point "a" (FIG. 8e) and generates a pulse that continues until point "b" (FIG. 8e). At low power, both the one-shot pulse duration "a-b" and conduction time to the load "c-d" are small (FIG. 8a). Hence, self oscillation "c-d-e . . . -e" begins relatively early. Comparator output $V_{co}$ tracks the polarity of this oscillation relative to $V_s$, with delay dT (FIG. 8b) However, toggling of the comparator output $V_{co}$ does not trigger any events, because the output $V_{to}$ of the timer 40 is at a low level (FIG. 8d), and so the gate 39 is held open and does not pass the signal $V_{co}$ to the one-shot input or timer input.

At point "h" the period of time $T_t$ expires and timer output $V_{to}$ goes high (FIG. 8d), the gate 39 closes, and $V_t$ starts to follow $V_{co}$ (FIG. 8c). Earliest positive transition of $V_{co}$ at point "j" (FIG. 8b) does not trigger any events, because the one-shot 31 and the timer 40 are negative transition sensitive. However, the negative transition of the comparator at "f" (FIG. 8b) restarts the whole switching cycle.

Figure 3:
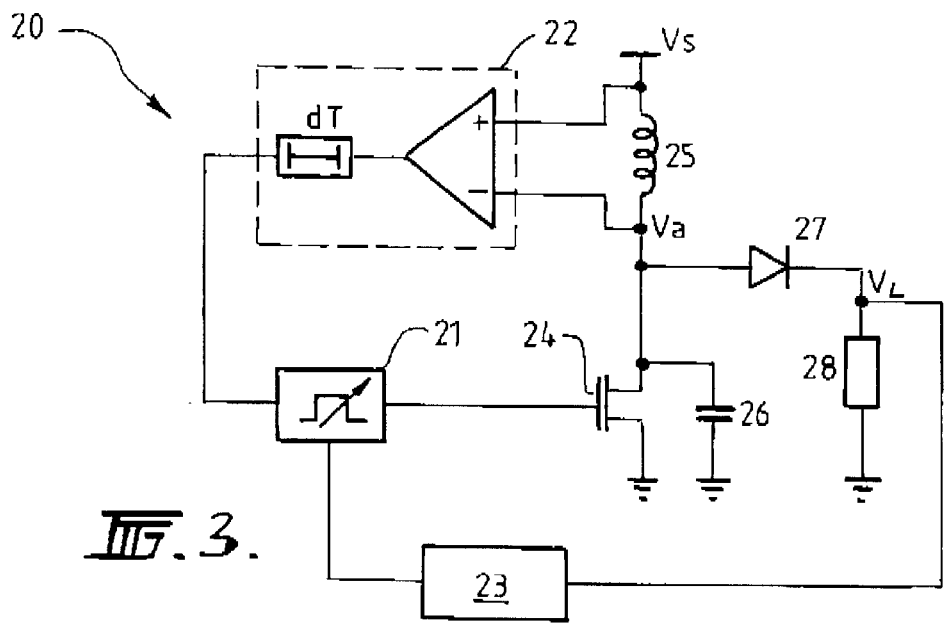
FIG. 3 illustrates a prior art quasi-resonant turn-on power stage.
Figure 4:
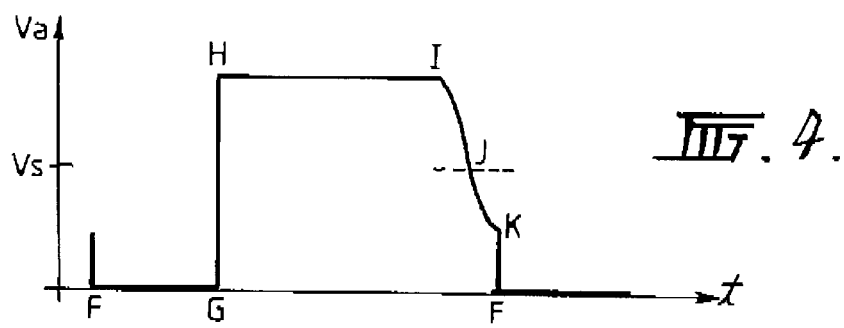
FIGS. 4 and 5 illustrate operation of the power stage of FIG. 3.
Figure 5:
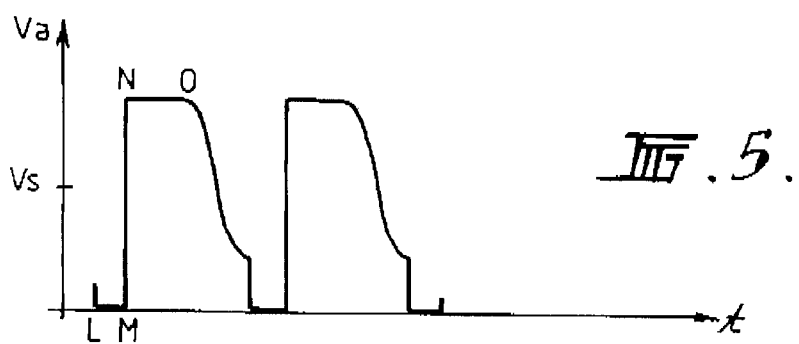

It follows from the description that the power stage switching cycle can not restart before $T_t$ expires as a result of the gate 39 being open throughout this period. Consequently, at low power the switching frequency of switch 34 is limited. Consequently, the switching loss is small compared to the prior art circuit of FIG. 3. Additionally, reduction of the parasitic capacitance 36 reduces switching losses proportionally, unlike in the prior art circuit of FIG. 3. Quasi-resonant turn-on (point "f") (FIGS. 7a, 8a) provides low distortion compared to the prior art circuit of FIG. 1.

Although the invention has been described with reference to a particular example, it is to be appreciated that it may be exemplified in other forms. The concept of the invention is applicable to any power conversion device operable in a discontinuous mode of operation, and may be implemented by way of hardware or software as will be recognised.

For instance, the comparator 32, feedback 33, one-shot 31, and timer 40 may all be implemented within a microprocessor, EPROM, EEPROM or the like.

Furthermore, although the embodiment described includes a feedback means 33 to control a pulse width of the one-shot based on a voltage of the load, it is to be appreciated that other embodiments of the invention may include feedback or feedforward control means. Further the feedback/feedforward control means may use load voltage, load current, supply voltage $V_s$, voltage across the switch means or a combination of the above to control a pulse duration of the one shot.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A power conversion device operable in a discontinuous conduction mode under the control of a switching means and wherein during operation in the discontinuous conduction mode, an oscillating voltage exists across the switching means prior to a turn-on of the switching means, the device comprising:

switch control means arranged to cause turn-on of the switching means to occur at a minimum of the oscillating voltage; and timing means arranged to provide a controlled time period following a first turn-on of the switching means, during which a second turn-on of the switching means can not occur.

2. The power conversion device of claim 1 wherein the timing means comprises:

a gate which, when open, prevents a turn-on signal from reaching the switching means; and a timer which is reset at each turn-on of the switching means, and holds the gate open for the controlled time period following each reset.

3. The power conversion device of claim 1 wherein the timing means comprises:

a gate which, when open, prevents generation of a turn-on signal; and a timer which is reset at each turn-on of the switching means, and holds the gate open for the controlled time period following each reset.

4. The power conversion device of claim 1 wherein the switch control means comprises:

a comparator arranged to compare the oscillating voltage to a reference voltage about which the oscillating voltage oscillates, and to produce an output logic signal corresponding to the polarity of the oscillating voltage with respect to the reference voltage;

delay means arranged to delay the output logic signal by one quarter of a period of oscillation of the oscillating voltage to produce a delayed logic signal; and a turn-on signal generator arranged to generate a turn-on signal for the switching means when the delayed logic signal indicates a negative polarity of the oscillating voltage with respect to the reference voltage.

5. The power conversion device as claimed in claim 4 wherein the delay means delays the output logic signal by a predetermined fixed time period substantially equal to one quarter of the period of oscillation.

6. The power conversion device as claimed in claim 4 wherein the delay means comprises a slope detector to monitor the oscillating voltage and to indicate when the oscillating voltage is at a minimum.

7. The power conversion device of claim 4 wherein the delay means is internal to the comparator.

8. The power conversion device of claim 4 wherein the delay means is separate to the comparator.

9. The power conversion device of claim 8 wherein the delay means is situated at the input of the comparator.

10. The power conversion device of claim 8 wherein the delay means is situated at the output of the comparator.

11. The power conversion device of claim 4 wherein the delay means is implemented by an analog circuit.

12. The power conversion device of claim 11 wherein the delay means is implemented by an RC delay circuit.

13. The power conversion device of claim 4 wherein the delay means is implemented by a digital circuit.

14. The power conversion device of claim 13 wherein the delay means is implemented by a chain of D flip-flops having C inputs connected to a clock signal.

15. The power conversion device of claim 4 wherein the delay means is implemented by software.

16. The power conversion device of claim 15 wherein the delay means is implemented by a loop in a microprocessor routine with timer interrupts.

17. A method of operating a power conversion device in a discontinuous conduction mode, the method comprising the steps of:

controlling operation of the device in the discontinuous conduction mode with a switching means;

causing turn-on of the switching means to occur when an oscillating voltage across the switching means is at a minimum; and providing a controlled time period following a first turn-on of the switching means, during which a second turn-on of the switching means can not occur.

18. The method of claim 17 wherein the step of providing the controlled time period comprises preventing a turn-on signal from reaching the switching means throughout the controlled time period.

19. The method of claim 18 further comprising holding a gate open throughout the controlled time period such that the turn-on signal is prevented from reaching the switching means.

20. The method of claim 17 wherein the step of causing turn-on of the switching means comprises:

comparing the oscillating voltage to a reference voltage about which the oscillating voltage oscillates;

producing an output logic signal corresponding to the polarity of the oscillating voltage with respect to the reference voltage;

delaying the output logic signal by one quarter of a period of oscillation of the oscillating voltage to produce a delayed logic signal; and generating a turn-on signal for the switching means when the delayed logic signal indicates a negative polarity of the oscillating voltage with respect to the reference voltage.

21. The method as claimed in claim 20 wherein the step of delaying comprises delaying the output logic signal by a predetermined fixed time period substantially equal to one quarter of the period of oscillation.

22. The method as claimed in claim 20 wherein the step of delaying comprises monitoring a slope of the oscillating voltage and indicating when the oscillating voltage is at a minimum.

23. A power conversion device comprising:

an inductor and a switch connected in series across a power supply;

a rectifier and a load connected in series across the switch;

a one-shot arranged to provide a pulse of controlled duration to the input of the switch;

a comparator and a delay means arranged to detect a voltage polarity reversal across the inductor and to produce a delayed logic signal corresponding to the voltage polarity across the inductor; and means for providing a controlled time period following a first pulse of the one-shot during which the comparator can not trigger the one-shot.

24. The power conversion device of claim 23 wherein the means for providing the controlled time period comprises a gate connected between an output of the comparator and an input of the one-shot, such that when the gate is held open for the controlled time period, any trigger signal produced by the comparator is prevented from triggering the one-shot during the controlled time period.

25. The power conversion device as claimed in claim 24 wherein the gate is controlled by a timer having a reset input connected to the input of the one-shot, such that each time the one-shot is triggered, the timer is reset and holds the gate open for the controlled time period.

26. The power conversion device as claimed in claim 23 and further comprising a feedback control means.

27. The power conversion device as claimed in claim 26 wherein the feedback means controls a pulse duration of the one-shot.

28. The power conversion device as claimed in claim 26 wherein the feedback means monitors current of the load for power regulation purposes and voltage across the inductive element for monitoring oscillations.

29. The power conversion device as claimed in claim 26 wherein the feedback means monitors voltage of the load for power regulation purposes and voltage across the inductive element for monitoring oscillations.

30. The power conversion device as claimed in claim 26 wherein the feedback means monitors current of the load for power regulation purposes and voltage across the switching means for monitoring oscillations.

31. The power conversion device as claimed in claim 26, wherein the feedback means monitors voltage of the load for power regulation purposes and voltage across the switching means for monitoring oscillations.

32. The power conversion device as claimed in claim 26 wherein the feedback means monitors voltage of the load and voltage of the power supply both for control purposes and for calculation of the expected oscillation minima.

33. The power conversion device as claimed in claim 26 wherein the feedback means monitors voltage of the load and voltage of the power supply for control purposes and voltage across the switching element for detecting oscillation minima.

34. The power conversion device as claimed in claim 26 wherein the feedback means monitors voltage across the switching means for indirect control and for detecting oscillation minima.

35. The power conversion device as claimed in claim 23, and further comprising a feedforward control means.

36. The power conversion device as claimed in claim 35 wherein the feedforward means controls a pulse duration of the one-shot.

37. The power conversion device as claimed in claim 23 wherein the delay means delays the logic signal by a fixed period substantially equal to one quarter of a period of oscillation of the oscillating voltage across the switch.

38. The power conversion device as claimed in claim 23 wherein the delay means comprises a slope detector to monitor the oscillating voltage and to indicate when the slope is substantially zero.

39. The power conversion device of claim 23 wherein the delay means is internal to the comparator.

40. The power conversion device of claim 23 wherein the delay means is situated at an input of the comparator.

41. The power conversion device of claim 23 wherein the delay means is situated at an output of the comparator.

42. The power conversion device of claim 23 wherein the delay means is implemented by an analog circuit.

43. The power conversion device as claimed in claim 42 wherein the delay means is implemented by an RC delay circuit.

44. The power conversion device of claim 23 wherein the delay means is implemented by a digital circuit.

45. The power conversion device as claimed in claim 44 wherein the delay means is implemented by a chain of D flip-flops having C inputs connected to a clock signal.

46. The power conversion device of claim 23 wherein the delay means is implemented by software.

47. The power conversion device as claimed in claim 46 wherein the delay means is implemented by a loop in a microprocessor routine with timer interrupts.

48. In a power conversion circuit operating in a discontinuous conduction mode under the control of a switching means, a voltage waveform across the switching means comprising:

a first voltage waveform portion during which the switching means is on, allowing a current to build in an inductive element;

a second voltage waveform portion after the first voltage waveform portion, during which the switching means is off, voltage across the switching means is non-zero and the current in the inductive element falls; and a third voltage waveform portion after the second voltage waveform portion during which the switching means remains off and the voltage waveform is oscillatory;

wherein a subsequent turn-on of the switching means occurs proximal to a minimum of the oscillatory voltage waveform, and wherein the subsequent turn-on of the switching means occurs only after a controlled time period has passed since the start of the first voltage waveform portion.

* * * * *